United States Patent

Scheidt et al.

[11] Patent Number: 6,075,865
[45] Date of Patent: Jun. 13, 2000

[54] CRYPTOGRAPHIC COMMUNICATION PROCESS AND APPARATUS

[75] Inventors: Edward M. Scheidt, McLean, Va.; C. Jay Wack, Clarksburg, Md.

[73] Assignee: TecSec Incorporated, Vienna, Va.

[21] Appl. No.: 09/108,312

[22] Filed: Jul. 1, 1998

[51] Int. Cl.[7] ........................................................ H04L 9/08
[52] U.S. Cl. ............................................. 380/255; 380/28
[58] Field of Search ................................... 380/28, 9, 29, 380/255

[56] References Cited

U.S. PATENT DOCUMENTS 5,375,169  12/1994  Seheidt et al. .............................. 380/21
5,787,173   7/1998  Scheidt et al. .
5,835,597  11/1998  Coppersmith et al. .

*Primary Examiner*—Tod R. Swann
*Assistant Examiner*—Todd Jack
*Attorney, Agent, or Firm*—Rabin & Champagne P.C.

[57] ABSTRACT

A communication system, which includes an origination space, a communications channel, and a destination space associated with the origination space via the communications channel. The origination space includes an encryption engine for generating an output symbol $O_t$ based on an input symbol $I_t$ and means for receiving an encrypt key, an encrypt text/key relation, and the input symbol. The destination space includes a decryption engine for generating a decrypted symbol $I'_t$ based on the output symbol received from the origination space via the communications channel and means for receiving a decrypt key and a decrypt text/key relation. The encrypt text/key relation controls the encryption engine such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key. The decrypt text/key relation controls the decryption engine such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key.

40 Claims, 2 Drawing Sheets

⊕: MOD W ADDITION

CRYPTOGRAPHIC COMMUNICATION PROCESS AND APPARATUS

FIELD OF THE INVENTION

The present invention relates to cryptographic systems. In particular, the present invention relates to a system for encrypting plaintext messages and decrypting ciphertext communications.

BACKGROUND OF THE INVENTION

In the modern world, communications are passed between parties in a variety of different ways utilizing many different communications media. Electronic communication is becoming increasingly popular as an efficient manner of transferring information, and electronic mail in particular is proliferating due to the immediacy of the medium.

Unfortunately, drawbacks accompany the benefits provided by electronic communication, particularly in the area of privacy. Electronic communications may be intercepted by unintended recipients. Wireless transmissions, such as voice communication by cellular telephone, and electronic mail are especially susceptible to such interception.

The problem of electronic communication privacy has been addressed, and solutions to the problem have been put in place. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to decrypt the encrypted message. There are a number of ways an unauthorized person may go about attempting to defeat the cryptography of a system. Three of the most popular attacks on cryptographic systems are key exhaustion attacks (trial and error), differential cryptanalysis, and algebraic attacks. Choosing more complicated text/key relations and longer keys are two ways to make a cryptographic scheme less vulnerable to attack, but result in a more expensive system that operates at a slower speed. Thus, unless a clever cryptographic scheme is devised to avoid successful attack, tradeoffs must be made when deciding the level of privacy to be provided.

Once a scheme for effecting cryptography is chosen to suit the constraints of the particular application, the text/key relation is usually the determining factor in how successful the cryptography will be in defeating attacks. This in turn affects the confidence that the parties to a communication will have that their communication will remain private.

SUMMARY OF THE INVENTION

It is therefore an object of the present invention to provide a process and apparatus for safeguarding the privacy of an electronic communication.

It is a further object of the present invention to provide a process and apparatus for encoding and decoding digital data.

One embodiment of the present invention includes a communication system, which includes an origination space, a communications channel, and a destination space associated with the origination space via the communications channel. The origination space includes an encryption engine for generating an output symbol $O_t$ based on an input symbol $I_t$ and means for receiving an encrypt key, an encrypt text/key relation, and the input symbol. The destination space includes a decryption engine for generating a decrypted symbol $I'_t$ based on the output symbol received from the origination space via the communications channel and means for receiving a decrypt key and a decrypt text/key relation. The encrypt text/key relation controls the encryption engine such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key. The decrypt text/key relation controls the decryption engine such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key.

According to one aspect of this embodiment, the encryption engine further includes W look-up tables for storing each of the possible W sets of permutations. According to a different aspect of this embodiment, the encryption engine further includes M<W look-up tables for storing M available sets of the possible W sets of permutations. According to a different aspect of this embodiment, the encryption engine further includes N<M<W look-up tables for storing N sets of permutations preselected from M available sets of the possible W sets of permutations. According to another aspect of this embodiment, $\alpha(t)$ is a step function. According to a further aspect of this embodiment, $\alpha_X(t)$, $X=\{0, 1, 2, \ldots, N-1, N\}$, increments the sequence of $\pi_X$ for each value that t equals an integer multiple of R, where R is a prime number. According to a different aspect of this embodiment, $\alpha_X(t)$, $X=\{0, 1, 2, \ldots, N-1, N\}$, decrements the sequence of $\pi_X$ for each value that t equals an integer multiple of R, where R is a prime number. According to a different aspect of this embodiment, $\alpha_X(t)$, $X=\{0, 1, 2, \ldots, N-1, N\}$, increments the sequence of $\pi_X$ for each value of t except when t equals an integer multiple of R, where R is a prime number. According to a different aspect of this embodiment, $\alpha_X(t)$, $X=\{0, 1, 2, \ldots, N-1, N\}$, decrements the sequence of $\pi_X$ for each value of t except when t equals an integer multiple of R, where R is a prime number. According to a further aspect of this embodiment, $I'_t$ corresponds to $I_t$.

Another embodiment of the present invention includes a communication system, which includes an origination space, a communications channel, and a destination space associated with the origination space via the communications channel. The origination space includes a receiver for receiving an input symbol $I_t$, an encrypt key, and an encrypt text/key relation, and an encryption engine, controllable by the encrypt text/key relation for generating an output symbol $O_t$ based on the input symbol, such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key. The destination space includes a receiver for receiving a decrypt key and a decrypt text/key relation, and a decryption engine, controllable for generating a decrypted symbol $I'_t$ based on the output symbol received from the origination space via the communications channel, such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key.

According to one aspect of this embodiment, the encryption engine further includes W look-up tables for storing each of the possible W sets of permutations. According to a different aspect of this embodiment, the encryption engine further includes M<W look-up tables for storing M available sets of the possible W sets of permutations. According to a different aspect of this embodiment, the encryption engine further includes N<M<W look-up tables for storing N sets of permutations preselected from M available sets of the possible W sets of permutations. According to another aspect of this embodiment, $\alpha(t)$ is a step function. According to a further aspect of this embodiment, $\alpha_X(t)$, $X=\{0, 1, 2, \ldots, N-1, N\}$, increments the sequence of $\pi_X$ for each value that t equals an integer multiple of R, where R is a prime number. According to a different aspect of this embodiment, $\alpha_X(t)$, $X=\{0, 1, 2, \ldots, N-1, N\}$, decrements the sequence of $\pi_X$ for each value that t equals an integer multiple of R, where R is a prime number. According to a different aspect of this embodiment, $\alpha_X(t)$, $X=\{0, 1, 2, \ldots, N-1, N\}$, increments the sequence of $\pi_X$ for each value of t except when t equals an integer multiple of R, where R is a prime number. According to a different aspect of this embodiment, $\alpha_X(t)$, $X=\{0, 1, 2, \ldots, N-1, N\}$, decrements the sequence of $\pi_X$ for each value of t except when t equals an integer multiple of R, where R is a prime number. According to a further aspect of this embodiment, $I'_t$ corresponds to $I_t$.

Another embodiment of the present invention includes a communication system, which includes a first computer, a communications channel, and a second computer coupled with the first computer via the communications channel. The first computer includes a symbol input port for receiving an input symbol $I_t$, an encrypt key input port for receiving an encrypt key, a first memory, for storing an encrypt text/key relation, and a first microprocessor for generating an output symbol $O_t$ based on the input symbol, controlled by the encrypt text/key relation such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key. The second computer includes a decrypt key input port for receiving a decrypt key, a second memory, for storing a decrypt text/key relation, and a second microprocessor for generating a decrypted symbol $I'_t$ based on the output symbol received from the origination space via the communications channel, controlled by the decrypt text/key relation such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key.

According to one aspect of this embodiment, the first computer further includes W look-up tables for storing each of the possible W sets of permutations. According to another aspect of this embodiment, the first computer further includes M<W look-up tables for storing M available sets of the possible W sets of permutations. According to another aspect of this embodiment, the first computer further includes N<M<W look-up tables for storing N sets of permutations preselected from M available sets of the possible W sets of permutations. According to a further aspect of this embodiment, $\alpha(t)$ is a step function. According to another aspect of this embodiment, $\alpha_X(t)$, $X=\{0, 1, 2, \ldots, N-1, N\}$, increments the sequence of $\pi_X$ for each value that t equals an integer multiple of R, where R is a prime number. According to another aspect of this embodiment, $\alpha_X(t)$, $X=\{0, 1, 2, \ldots, N-1, N\}$, decrements the sequence of $\pi_X$ for each value that t equals an integer multiple of R, where R is a prime number. According to another aspect of this embodiment, $\alpha_X(t)$, $X=\{0, 1, 2, \ldots, N-1, N\}$, increments the sequence of $\pi_X$ for each value of t except when t equals an integer multiple of R, where R is a prime number. According to another aspect of this embodiment, $\alpha_X(t)$, $X=\{0, 1, 2, \ldots, N-1, N\}$, decrements the sequence of $\pi_X$ for each value of t except when t equals an integer multiple of R, where R is a prime number. According to a further aspect of this embodiment, $I'_t$ corresponds to $I_t$.

The present invention also provides a process for communication between an origination space and a destination space. The process includes receiving an input symbol $I_t$ at the origination space and generating an output symbol $O_t$ based on the input symbol, such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 predetermined additive transformations, where $\pi_N, \pi_{N-1}, \ldots, \pi_2, \pi_0$ are N predetermined permutations, and where W represents the number of possibilities for each permutation. The output symbol is then received at the destination space, and a decrypted symbol $I'_t$ is generated, based on the received output symbol, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is an inverse of the predetermined permutation $\pi_i$, where $\alpha'_N, \alpha'_{N-1}, \ldots, \alpha'_1, \alpha'_0$ are N+1 predetermined additive transformations, and where W represents the number of possibilities for each inverse permutation.

According to a further aspect of the process, the possible W sets of permutations are retrieved from W look-up tables, prior to generating the output symbol. According to a further aspect of the process, M available sets of the possible W sets of permutations are retrieved from M<W look-up tables, prior to generating the output symbol. According to a further aspect of the process, N sets of permutations preselected from M available sets of the possible W sets of permutations are retrieved from N<M<W look-up tables, prior to generating the output symbol. According to a further aspect of the process, $\alpha(t)$ is a step function. According to a further aspect of the process, $\alpha_X(t), X=\{0, 1, 2, \ldots, N-1, N\}$, is used to increment the sequence of $\pi_X$ for each value that t equals an integer multiple of R, where R is a prime number. According to a further aspect of the process, $\alpha_X(t), X=\{0, 1, 2, \ldots, N-1, N\}$, is used to decrement the sequence of $\pi_X$ for each value that t equals an integer multiple of R, where R is a prime number. According to a further aspect of the process, $\alpha_X(t), X=\{0, 1, 2, \ldots, N-1, N\}$, is used to increment the sequence of $\pi_X$ for each value of t except when t equals an integer multiple of R, where R is a prime number. According to a further aspect of the process, $\alpha_X(t), X=\{0, 1, 2, \ldots, N-1, N\}$, is used to decrement the sequence of $\pi_X$ for each value of t except when t equals an integer multiple of R, where R is a prime number. According to a further aspect of the process, $I'_t$ corresponds to $I_t$.

Another embodiment of the present invention includes a magnetic storage medium, which includes an interface, and a controller for controlling a microprocessor, via the interface, to produce an output symbol $O_t$, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $I_t$ is an input symbol, $\alpha_N, \alpha_{N-1}, \ldots, \alpha_1, \alpha_0$ are N+1 additive transformations defined by a key, $\pi_N, \pi_{N-1}, \ldots, \pi_2, \pi_0$ are N permutations defined by the key, and W represents the number of possibilities for each permutation defined by the key.

According to a further aspect of this embodiment, $\alpha(t)$ is a step function. According to a further aspect of this embodiment, $\alpha_X(t), X=\{0, 1, 2, \ldots, N-1, N\}$, increments the sequence of $\pi_X$ for each value that t equals an integer multiple of R, where R is a prime number. According to another aspect of this embodiment, $\alpha_X(t), X=\{0, 1, 2, \ldots, N-1, N\}$, decrements the sequence of $\pi_X$ for each value that t equals an integer multiple of R, where R is a prime number. According to another aspect of this embodiment, $\alpha_X(t), X=\{0, 1, 2, \ldots, N-1, N\}$, increments the sequence of $\pi_X$ for each value of t except when t equals an integer multiple of R, where R is a prime number. According to another aspect of this embodiment, $\alpha_X(t), X=\{0, 1, 2, \ldots, N-1, N\}$, decrements the sequence of $\pi_X$ for each value of t except when t equals an integer multiple of R, where R is a prime number.

Another embodiment of the present invention includes a magnetic storage medium, which includes an interface, and a controller for controlling a microprocessor, via the interface, to produce a generated symbol $I'_t$, such that $I'_t = \pi_1^{-1}[\pi_2^{-1}[\pi_3^{-1} \ldots [\pi_{N-1}^{-1}[\pi_N^{-1}[O_t - \alpha_N(t)] - \alpha_{N-1}(t)] - \ldots - \alpha_3(t)] - \alpha_2(t)] - \alpha_1(t)] - \alpha_0(t)$, mod W, where $O_t$ is a received symbol, $\alpha_N, \alpha_{N-1}, \ldots, \alpha_1, \alpha_0$ are N+1 additive transformations defined by a key, $\pi_1^{-1}, \pi_2^{-1}, \pi_3^{-1} \ldots, \pi_{N-1}^{-1}, \pi_N^{-1}$ are N inverse permutations defined by the key, and W represents the number of possibilities for each inverse permutation defined by the key.

According to a further aspect of this embodiment, $\alpha(t)$ is a step function. According to a further aspect of this embodiment, $\alpha_X(t), X=\{0, 1, 2, \ldots, N-1, N\}$, increments the sequence of $\pi_X$ for each value that t equals an integer multiple of R, where R is a prime number. According to another aspect of this embodiment, $\alpha_X(t), X=\{0, 1, 2, \ldots, N-1, N\}$, decrements the sequence of $\pi_X$ for each value that t equals an integer multiple of R, where R is a prime number. According to another aspect of this embodiment, $\alpha_X(t), X=\{0, 1, 2, \ldots, N-1, N\}$, increments the sequence of $\pi_X$ for each value of t except when t equals an integer multiple of R, where R is a prime number. According to another aspect of this embodiment, $\alpha_X(t), X=\{0, 1, 2, \ldots, N-1, N\}$, decrements the sequence of $\pi_X$ for each value of t except when t equals an integer multiple of R, where R is a prime number.

BRIEF DESCRIPTION OF THE DRAWINGS

These and other objects, features, and advantages of the present invention will be apparent by way of the following detailed description, which includes preferred but non-limiting embodiments. The description is made with reference to the accompanying drawings, wherein.

DETAILED DESCRIPTION OF THE INVENTION

Figure 1:
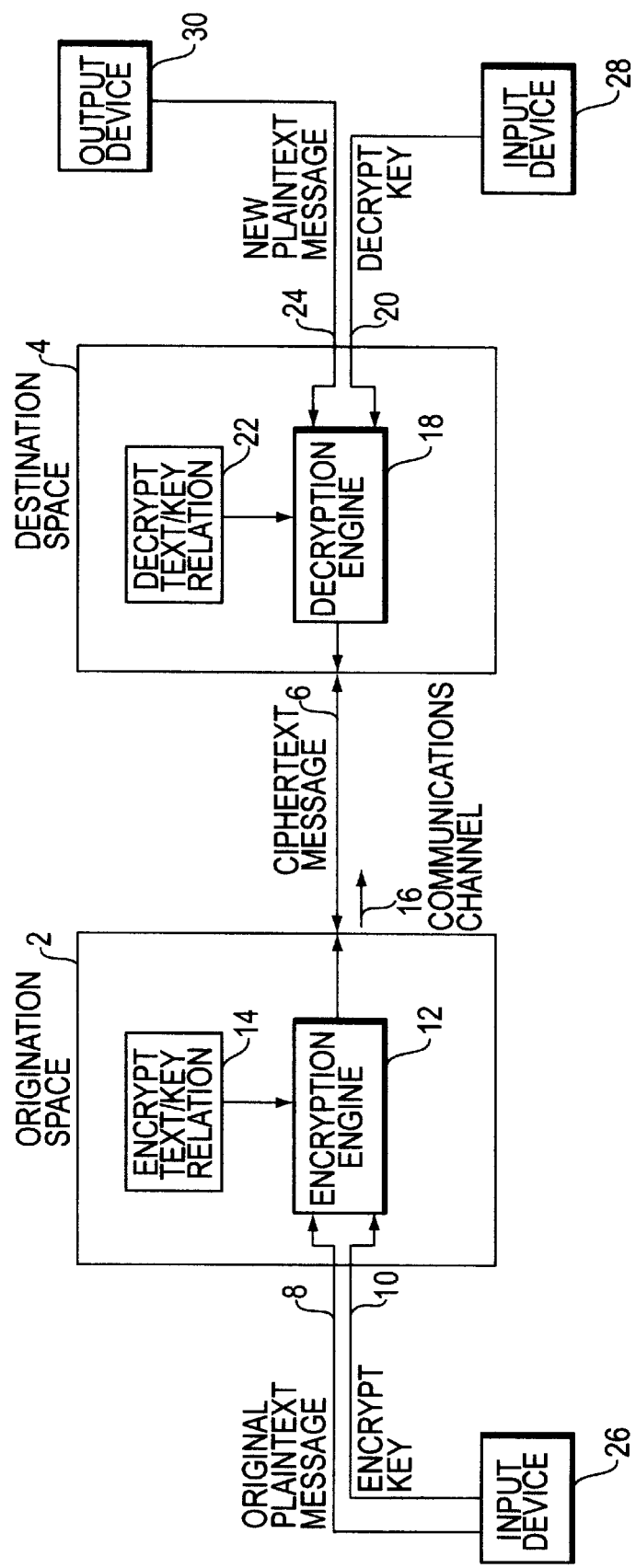
FIG. 1 shows a block diagram of a communications event featuring cryptography.

Referring to FIG. 1, a communication has an origination space 2 and a destination space 4. The origination space 2 defines the place and time at which the communication originates. The destination space 4 defines the place and time at which the communication is decoded or intended to be decoded. The origination space 2 and the destination space 4 may be remote in location. Alternatively, they may be collocated but displaced in time. The space and time correspondence between the origination space 2 and the destination space 4 depends on the nature of a particular communication. The origination space 2 and destination space 4 are associated with a common communications channel 6. This communications channel 6 may bridge a physical space, such as empty air in the case of a cellular voice telephone call. Alternatively, the communications channel 6 may be temporary storage for the communication while time passes between the origination space 2 and the destination space 4, such as a message left in memory on a computer by a first user, for a second user to read at a later time on the same computer. The communications channel 6 may also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer may have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, biometrics reader, or device for reading the modal functions of a visible light signal source, can also be provided for accepting the key and plaintext message from the origination user, and the key from the destination user. At the destination space 4, an output device 30, such as a monitor, disk drive, or audio speaker, may be also be provided to present the new plaintext message to the destination user. The text/key relation can be stored on a floppy disk or other permanent or temporary portable storage, rather than in hard storage in the computer, to allow different text/key relations to be applied by different users or in different situations.

The text/key relation of the present invention is based upon the interlaced relationship of a set of a number N of permutations together with a number N+1 of additive transformations. In cases when an input communication is encrypted in blocks, the input plaintext message $I_t$, composed of t blocks, is encrypted according to the relation to produce the output ciphertext message $O_t$. The permutations, initial values of the additive transformations, and other parameters of the text/key relation are determined by the key.

Figure 2:
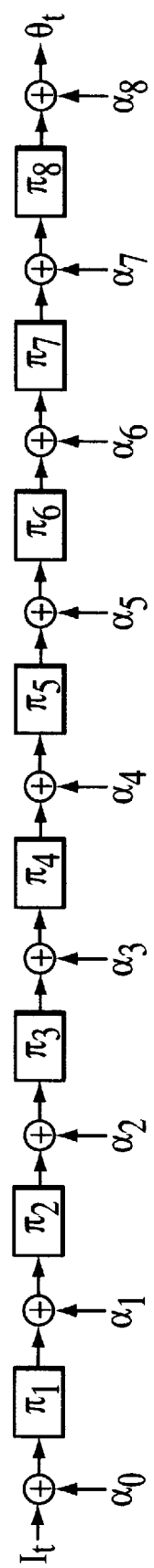
FIG. 2 is a block diagram showing the implementation of the text/key relation of the present invention.

As shown in FIG. 2, mapping according to the text/key relation of the invention creates an output symbol $O_t$ from an input symbol $I_t$ as follows:

$$O_t = F_t(I_t) = \alpha_N(t) + \pi_N[\alpha_{N-1}(t) + \alpha_{N-1}[\alpha_{N-2}(t) + \ldots + \pi_2[\alpha_1(t) + \pi_1[I_t + \alpha_0(t)]] \ldots ]], \mod W,$$

where $\alpha_N, \alpha_{N-1}, \ldots, \alpha_1, \alpha_0$ are the N+1 additive transformations, $\pi_N, \pi_{N-1}, \ldots, \pi_2, \pi_0$ are the N permutations and W represents the number of possibilities for each permutation. That is, the input symbol $I_t$ is modulo-W added to $\alpha_0(t)$, and the result is looked up in the permutation table $\pi_1$. The output from the $\pi_1$ look-up is modulo-W added to $\alpha_1(t)$, and so on. This mapping of the input symbol $I_t$ at step t is used to generate the output symbol $O_t$.

The corresponding decrypt operation, $F_t^{-1}$, requires that the input symbol $I_t$ at step t be derived from the output symbol $O_t$. This is accomplished according to the following:

$$I_t = F^{-1}(O_t) = \pi_1^{-1}[\pi_2^{-1}[\pi_3^{-1} \ldots [\pi_{N-1}^{-1}[\pi_N^{-1}[O_t - \alpha_N(0)] - \alpha_{N-1}(0)] - \ldots - \alpha_3(0)] - \alpha_2(0)] - \alpha_1(0)] - \alpha_0(0), \mod W,$$

where $\pi_i^{-1}$ is the inverse of the permutation $\pi_i$.

That is, $\alpha_N(0)$ is modulo-W subtracted from the output symbol $O_t$, and the result is looked up in the $\pi_N^{-1}$ permutation table. The result of the look-up, $\alpha_{N-1}(0)$, is modulo-W subtracted from this result and looked up in $\pi_{N-1}^{-1}$, and so on.

The permutations $\pi_1, \pi_2, \ldots, \pi_{N-1}, \pi_N$ are taken across the space 0-W, resulting in W! possibilities for $\pi$. For practical purposes, a smaller number M of the W! possible tables for $\pi$ can be made available to a user, and the smaller number N can be selected for the particular cryptoperiod, with the particular N tables determined based on information in the key. Once the N permutations are chosen, the starting points for first applying each permutation are provided by information in the key.

The additive transformations $\alpha_0, \alpha_1, \ldots, \alpha_{N-1}, \alpha_N$ are values which determine how the permutations will be stepped before the next permutation value is looked up. The incrementing function provided by the additive transformations can be count dependent or value dependent. For example, a count dependent additive transformation could provide for incrementing the sequence of the following permutation table by one place every R times through the encryption process, where R is preferably a large prime number. Another count dependent additive transformation could provide for incrementing the sequence of the following permutation table by one place every J times through the encryption process, where J is preferably a different large prime number. Still another count dependent additive transformation could provide for a hesitation, that is, incrementing the sequence of the following permutation table by one place every time through the encryption process with the exception of every L times through, where L is preferably a different large prime number. A value dependent additive transformation can increment the sequence of the following permutation table according to the value of a previous output, for example, the output from the previous permutation table or a previous symbol. This value can be used not only to determine whether the following sequence will be incremented, but also the extent to which it is incremented.

As a non-limiting example, a particular text/key relation having eight permutations and nine additive transformations will be described. The eight permutations, $\Pi = \pi_1, \pi_2, \pi_3, \pi_4, \pi_5, \pi_6, \pi_7, \pi_8$, are performed, for example, on the symbols 0, 1, 2, Ö, 255 of a 256 symbol block of the original plaintext message. In this example, the eight permutations are selected from a stored set of 25 permutations and are determined by, for example, the first eight symbols in the cryptographic key. The nine additive transformations utilized at step t of the relation are designated $A(t) = \alpha_0(t), \alpha_1(t), \alpha_2(t), \alpha_3(t), \alpha_4(t), \alpha_5(t), \alpha_6(t), \alpha_7(t), \alpha_8(t)$. The initial value at t=0, A(0), is determined by, for example, nine symbols in the cryptographic key. At the end of each application of the text/key relation in this example, the additive transformations, A(t), are modified deterministically, but the selected eight permutations remain in place until the key is changed. The process for changing A(t) varies for different modes of the text/key relation.

An exemplary process for changing A(t) is described below as part of a block cipher mode. $S(t) = S_4(t), S_3(t), S_2(t), S_1(t)$ represents a 4-symbol plaintext input at time t, which is to be encrypted. The initial value of the plaintext at time i=0, S(0), is the 4 symbol input word $$I(0) = I_4(0), I_3(0), I_2(0), I_1(0); \text{ i.e., } S_j(0) = I_j(0), j=1,\ddot{O},4.$$

For i=0,Ö, 15, (16 rounds of encryption are performed on each block of data in this example) S(t+1) may be computed, for example, from state S(t) as follows:

$S_4(t+1) = F_t(S_1(t))$,
$S_3(t+1) = S_4(t+1)$,
$S_2(t+1) = S_3(t+1)$,
$S_1(t+1) = F_t(S_1(t)) + S_2(t)$ where $F_t$, is the t-th F function defined by $\Pi$. $A(t) = \alpha_0(t), \alpha_1(t), \alpha_2(t), \alpha_3(t), \alpha_4(t), \alpha_5(t), \alpha_6(t), \alpha_7(t), \alpha_8(t)$ and is generated as follows:

Given $\Pi$, A(0), and X(4), X(3), X(2), X(1), which are used to generate A(t), t=1, 2, 3, . . . , 16, from the key, 36 4-symbol output words of the block cipher are computed. During this entire process, the setting A(0) from the key is used in the text/key relation and does not change.

This creates a total of 144 symbols which are then partitioned into 16 9-symbol sequences A(1), Ö, A(16), as follows:

A(1)=the first nine output symbols
A(2)=the second nine output symbols
Ö
A(16)=the last nine output symbols This computation of A(1), A(2)Ö.A(16) is preferably accomplished at the time the key is loaded. This is done to make processing of communications much faster and to minimize storage requirements.

The ciphertext output at time t=16, S(16), is the output O(0), the block cipher transformation of the input word I(0); that is, $S(16)=S_4(16), S_3(16), S_2(16), S_1(16)=O(0)=O_4(0), O_3(0), O_2(0), O_1(0)$ The sequences A(1), A(2), Ö, A(16) are the set of additives used to define the sixteen permutations to encrypt in the block cipher mode. To decrypt the output, the inverse permutations and the additives are used in reverse order, that is, A(16), A(15), Ö, A(1).

The security of the block cipher mode is based on the security of the text/key relation and the cryptanalytic resistant mixing properties of an iterated non-linear feedback function. The text/key relation is a symbol permutation consisting of the product of N randomly selected permutations which are selected from a set of M permutations which in turn are selected from the full set of W! permutations on W elements. The N permutations change according to a deterministic, but unknown, rule with each application of the function. Thus, even if the same symbol were presented to the text/key relation at two different rounds within the processing of a single block, the permutation applied to that symbol would be the same only with a probability of 1/W. This maximizes the uncertainty across the total number of rounds of the block cipher.

The use of the text/key relation in this system is particularly difficult to attack. The inputs have random components and are limited in length. The outputs are limited to a subset of bits from the resulting fixed-length output. Thus, one will not have matched input-output words, which are normally necessary to analyze a relation as complex as the cipher block of the present invention. Further, because the key may be changed periodically, for example, every 30 minutes or so, the number of inputs processed by using a single key is limited. Thus, the incomplete nature of the observable functional relationship coupled with the relatively small number of functional values make cryptanalysis of the block cipher of the present invention very difficult.

The number of rounds (for example, 16) of processing in the block cipher mode can be chosen to maximize the non-linear mixing of the contents of the register. This ensures that the data in each of the registers are processed according to the text/key relation a large number of times. For example, the symbol initially in stage 1 is manipulated according to the text/key relation in every one of the 16 rounds of processing, while the symbol initially in stage 4 of the register and last to be processed according to the text/key relation is manipulated 12 times. Thus, the contents of each stage of the block cipher register is a highly nested, non-linear function relating output to input.

The configuration of the feedback results in at least two beneficial effects. Firstly, the linear element reduces any non-randomness which might be present. Secondly, the location of the feedback quickly introduces differences into the non-linear shift register and keeps them there once they appear, with a probability equal to what one expects at random. As soon as a different symbol is presented for processing in stage 1, the text/key relation places a difference in stage 4 of the register at the next step with certainty and also probabilistically puts a difference in stage 1 of the register. Thus, a single difference in stage 1 of the register has the effect of multiplying itself with high probability at the next step of block cipher processing. With addition, there is always the possibility of cancellation, but in the selected block cipher configuration, the probability of this happening is no better than random. Consider an initial configuration of the register of the form DSSS, that is, two different times in which the initial states of stage 4 of the register contains symbols which are different while the other three stages of the register contain the same contents. This configuration has the maximum delay before the text/key relation is applied. Then, since each step of the text/key relation is a permutation, at step 6 of the block cipher processing, the contents of the register is DDDD with probability p=1. At step 10 of the process, the contents of the register is SSSS with probability of only $(\frac{1}{2})^{32}$, which is what one would expect at random. However, there are still 6 steps to go at that point before an output is produced. Any other initial input configuration will introduce differences even earlier in the process. Thus, this design is robust against differential cryptanalysis techniques.

If, for example, there are a total of W=256! permutations of 256 elements from which the M=25 basic permutations of the system are selected, the number of sets of 25 basic permutations is approximately $W^{25}/M!$, which is enormous. However, even if we consider the set of permutations to be known, the number of keys is still very large. If 8 permutations are selected from the 25 permutations with replacement, the number of possible sets of permutations is approximately $25^8=10^{11}$. Now the 16 linear additives necessary for the block cipher are generated by the block cipher operating on an unknown 32-bit initial state of the register with a fixed unknown additive defined by a 72-bit sequence. This provides an additional $2^{104}=10^{31}$ possibilities. The total key space for a known set of 25 permutations is on the order of $10^{42}$. This is a key space that is sufficiently large to preclude exhaustive key search well into the next century and also to resist other shortcut cryptanalytic attacks should they exist.

In addition to the selection of the base set of permutations on 256 elements from which the key variable is chosen, there are a number of variants of the block cipher which provide for uniqueness for authentication purposes. Each of these variants has both a performance impact and a security impact. For example, the length of the non-linear register can be changed to accommodate longer or shorter challenges. The non-linear feedback to the register can be changed or the number of rounds of incrementing of the register can be changed to obtain variability. The techniques for generating the set of additives during block cipher processing can be changed so that they are unrelated to the block cipher mode itself.

To give an idea of the strength of the block cipher mode of the text/key relation of the present invention, three of the most popular attack methods found in the world́s cryptanalytic literature will be discussed. These methods are: key exhaustion or trial and error attack, differential cryptanalysis, and algebraic attack.

A key exhaustion attack is a brute force method in which every possible combination of bits is generated as a potential key and is applied to the system in an attempt to fortuitously produce the valid key. There are $25\times24\times23\times22\times21\times20\times19\times18=43,609,104,000=10^{10.64}$ possible choices for the eight permutations $\pi_1, \pi_2, \pi_3, \pi_4, \pi_5, \pi_6, \pi_7, \pi_8$, and there are $256^9=10^{21.67}$ possible choices for the nine symbols A(0) for the initial additive transformation. Finally, there are $256^4=$ $10^{9.63}$ possible choices for the initial key fill, X(1), X(2), X(3), X(4) used to develop the A(t), t=1, 2, 3, . . . , 16.

Thus, the key diversity, or the cardinality of the key space, is $10^{10.64+21.67+9.63}=10^{41.94}$. If one were to try all possible keys in some kind of trial-and-error attack, he or she would expect, on average, to find the correct key half-way through the process, or after about $10^{41.64}$ trials. Such an attack would be impractical and, using current technology, could not be completed in one century. If the key is defined as valid for only a fixed amount of time, 30 minutes for example, a key exhaustion attack is very unlikely to succeed.

Probably the most popular short-cut cryptanalytic attack today is differential cryptanalysis. The basic idea behind the attack is to compare the encrypted versions of two (or more) input words that have very few differences under the assumption that the differences in the output may depend on some subset of the key or perhaps a related key with smaller diversity.

The following best case scenario can be envisioned for the attacker:

1. Select pairs of the 32-bit input words which have only a single bit difference.
2. For each of the 16 steps in the block cipher, compare the results after each step.
3. Look for relationships between these differences and particular choices for the 21 symbols of the key.

Through the first eight steps, deterministic differences can be observed that might be related to key choices. However, after nine of the 16 steps, the difference pattern cannot be distinguished from a random selection of the $2^{32}$ possible difference patterns. After this ninth step, the algorithm has seven more steps before the output is generated so that a cryptanalyst can use the results in any testing. Those seven steps further randomize the difference patterns. It is therefore very unlikely that this type of attack would succeed.

The result would not be any better for an algebraic attack. If the permutations are written in the form of permutation matrices, the results are 0, 1 matrices with exactly one value in each row and column. In the algebraic representation of the text/key relation of the present invention, these matrices are multiplied together in various combinations with the additive transformations. The result is that the algebraic expression for a single input/output mapping is an 8-th degree polynomial. For the block cipher mode, the algebraic expression for the output in terms of the input has a higher degree and is much more complex. Even if someone could find a way to solve systems of high degree polynomials, the equations for the block cipher mode would not be solvable in practice.

One practical application for a cryptographic system of the present invention is an Identification Friend or Foe (IFF) system. In such a system, a target is identified and interrogated with an encrypted interrogation signal. If the target is friendly, it will be equipped with a transponder that is able to decrypt the interrogation, read information included in the interrogation, and, based on the information, generate an encrypted reply for transmission to the interrogator. If the interrogator receives a proper reply during a proper response window, the reply is evaluated as valid and the target is identified as a friendly target. If a valid reply is not received, the target is treated as an enemy.

Because encrypted signals are transmitted between the interrogator and the transponder, each must have a valid key, or a valid set of keys if the keys are to be changed periodically. In the following example, valid keys are replaced every 30 minutes for security reasons. Thus, each interrogator and transponder must be loaded, or filled, with 48 keys for each daily mission. Each of the 48 keys that are entered daily in the IFF equipment is 21 symbols, $K_1$, $K_2$, $K_3$, Ö $K_{21}$, and these are used in this example as follows:

$K_1$, $K_2$, $K_3$, $K_4$, $K_5$, $K_6$, $K_7$, $K_8 = \pi_1$, $\pi_2$, $\pi_3$, $\pi_4$, $\pi_5$, $\pi_6$, $\pi_7$, $\pi_8$
$K_9$, $K_{10}$, $K_{11}$, $K_{12}$, $K_{13}$, $K_{14}$, $K_{15}$, $K_{16}$, $K_{17} = \alpha_0(t)$, $\alpha_1(t)$, $\alpha_2(t)$, $\alpha_3(t)$, $\alpha_4(t)$, $\alpha_5(t)$, $\alpha_6(t)$, $\alpha_7(t)$, $\alpha_8(t)$
$K_{18}$, $K_{19}$, $K_{20}$, $K_{21} = X(1)$, $X(2)$, $X(3)$, $X(4)$ When each of the keys is loaded into the equipment, 144 additional symbols A(1), A(2), . . . , A(16) are computed to make the processing of IFF challenges/replies much faster and these are appended to the 21 key symbols for a total of 165 symbols, $K_1$, $K_2$, $K_3$, Ö $K_{165}$. The storage requirement for the 48 keys per day is thus 48×165=7920 symbols, or about 8K symbols.

As described above, a preferred key for use in conjunction with the cryptographic system of the invention has three parts:

1. Eight symbols which are randomly selected from among the integers 1Ö.0.25.
2. Nine random symbols.
3. Four random symbols.

Except for the requirement that the first eight symbols are random numbers in the range 1 to 25, there are no restrictions placed on the generation of the key. However, the key generation process must be carefully checked to ensure that it has not developed any faults or non-random properties. Any good known randomizer is adequate for this purpose.

Once the keys are generated, they may be encrypted for transmission. It is preferable that they be grouped, with each group containing a one month supply of 31×48=1488 keys.

Each monthly group of keys may be encrypted by the block cipher as described above, using a ìKey Encrypting Keyî (KEK) that is manually distributed on a periodic basis having a frequency such that the physical security is adequate to support a set cryptoperiod, one year for example, for the KEK.

Other guidelines are appropriate for managing keys in operational IFF equipment. For example, only two-days worth of keys, namely, today is and tomorrow is keys, should be stored in this equipment, assuming that the IFF equipment returns to a main base within every two-day period. If that is not the case, this guideline could be relaxed to replace two days with the maximum time the equipment is away from base. Similar security considerations should be addressed in other applications of the system of the invention. The invention has been described using exemplary and preferred embodiments. However, the scope of the present invention is not limited to these particular disclosed embodiments. To the contrary, the present invention is contemplated to encompass various modifications and similar arrangements The scope of the claims, therefore, should be accorded the broadest interpretation so as to include all such modifications and similar arrangements. For example, an exemplary block cipher mode of the present invention has been described in detail. However, it is apparent to those of ordinary skill in the art that the method and apparatus described herein may easily be applied to a plaintext message received and processed as a stream, rather than in blocks, without departing from the spirit and scope of the present invention.

What is claimed is:

1. A communication system, comprising:
   a) an origination space;
   b) a communications channel; and
   c) a destination space associated with the origination space via the communications channel;

d) wherein the origination space includes:
  1) an encryption engine for generating an output symbol $O_t$ based on an input symbol $I_t$; and
  2) means for receiving an encrypt key, an encrypt text/key relation, and the input symbol;
e) wherein the destination space includes:
  1) a decryption engine for generating a decrypted symbol $I'_t$ based on the output symbol received from the origination space via the communications channel; and
  2) means for receiving a decrypt key and a decrypt text/key relation;
f) wherein the encrypt text/key relation controls the encryption engine such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key where $\pi_N, \pi_{N-1}, \ldots, \pi_2, \pi_0$ are N permutations defined by the encrypt key, and where W represents the number of possibilities for each permutation defined by the encrypt key;
g) wherein the decrypt text/key relation controls the decryption engine such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and
h) wherein $I'_t$ corresponds to $I_t$.

2. The communication system of claim 1, wherein the encryption engine further includes W look-up tables for storing each of the possible W sets of permutations.

3. The communication system of claim 1, wherein the encryption engine further includes M<W look-up tables for storing M available sets of the possible W sets of permutations.

4. The communication system of claim 1, wherein the encryption engine further includes N<M<W look-up tables for storing N sets of permutations preselected from M available sets of the possible W sets of permutations.

5. A communication system, comprising:
a) an origination space;
b) a communications channel; and
c) a destination space associated with the origination space via the communications channel;
d) wherein the origination space includes:
  1) an encryption engine for generating an output symbol $O_t$ based on an input symbol $I_t$; and
  2) means for receiving an encrypt key an encrypt text/key relation and the input symbol;
e) wherein the destination space includes:
  1) a decryption engine for generating a decrypted symbol $I'_t$ based on the output symbol received from the origination space via the communications channel; and
  2) means for receiving a decrypt key and a decrypt text/key relation;
f) wherein the encrypt text/key relation controls the encryption engine such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;
g) wherein the decrypt text/key relation controls the decryption engine such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and
h) wherein $\alpha(t)$ is a step function, and $\alpha_X(t)$, X={0, 1, 2, ..., N-1, N}, increments the sequence of $\pi_X$ for each value that t equals an integer multiple of R, where R is a prime number.

6. A communication system, comprising:
a) an origination space;
b) a communications channel; and
c) a destination space associated with the origination space via the communications channel;
d) wherein the origination space includes:
  1) an encryption engine for generating an output symbol $O_t$ based on an input symbol $I_t$; and
  2) means for receiving an encrypt key, an encrypt text/key relation, and the input symbol;
e) wherein the destination space includes:
  1) a decryption engine for generating a decrypted symbol $I'_t$ based on the output symbol received from the origination space via the communications channel; and
  2) means for receiving a decrypt key and a decrypt text/key relation;
f) wherein the encrypt text/key relation controls the encryption engine such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;
g) wherein the decrypt text/key relation controls the decryption engine such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and
h) wherein $\alpha(t)$ is a step function, and $\alpha_X(t)$, X={0, 1, 2, ..., N-1, N}, decrements the sequence of $\pi_X$ for each value that t equals an integer multiple of R, where R is a prime number.

7. A communication system, comprising:
a) an origination space;
b) a communications channel; and
c) a destination space associated with the origination space via the communications channel;
d) wherein the origination space includes:
  1) an encryption engine for generating an output symbol $O_t$ based on an input symbol $I_t$; and
  2) means for receiving an encrypt key, an encrypt text/key relation, and the input symbol;

e) wherein the destination space includes:
  1) a decryption engine for generating a decrypted symbol $I'_t$ based on the output symbol received from the origination space via the communications channel; and
  2) means for receiving a decrypt key and a decrypt text/key relation;
f) wherein the encrypt text/key relation controls the encryption engine such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key where $\pi_N, \pi_{N-1}, \ldots, \pi_2, \pi_0$ are N permutations defined by the encrypt key, and where W represents the number of possibilities for each permutation defined by the encrypt key;
g) wherein the decrypt text/key relation controls the decryption engine such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots \alpha'_1, \alpha'_0$ are N+1 additive transformations defined by the decrypt key, and where W represents the number of possibilities for each inverse permutation defined by the decrypt key; and
h) wherein $\alpha(t)$ is a step function and $\alpha_X(t)$, X={0, 1, 2, ..., N−1, N}, increments the sequence of $\pi_X$ for each value of t except when t equals an integer multiple of R, where R is a prime number.

8. A communication system, comprising:
a) an origination space;
b) a communications channel; and
c) a destination space associated with the origination space via the communications channel;
d) wherein the origination space includes:
  1) an encryption engine for penerating an output symbol $O_t$ based on an input symbol $I_t$; and
  2) means for receiving an encrypt key, an encrypt text/key relation and the input symbol;
e) wherein the destination space includes:
  1) a decryption engine for generating a decrypted symbol $I'_t$ based on the output symbol received from the origination space via the communications channel; and
  2) means for receiving a decrypt key and a decrypt text/key relation;
f) wherein the encrypt text/key relation controls the encryption engine such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;
g) wherein the decrypt text/key relation controls the decryption engine such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and
h) wherein $\alpha(t)$ is a step function, and $\alpha_X(t)$, X={0, 1, 2, ..., N−1, N}, decrements the sequence of $\pi_X$ for each value of t except when t equals an integer multiple of R, where R is a prime number.

9. A communication system, comprising:
a) an origination space;
b) a communications channel; and
c) a destination space associated with the origination space via the communications channel;
d) wherein the origination space includes:
  1) means for receiving an input symbol $I_t$, an encrypt key, and an encrypt text/key relation; and
  2) an encryption engine, controllable by the encrypt text/key relation for generating an output symbol $O_t$ based on the input symbol, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$, are N permutations defined by the encrypt key, and where W represents the number of possibilities for each permutation defined by the encrypt key;
e) wherein the destination space includes:
  1) means for receiving a decrypt key and a decrypt text/key relation; and
  2) a decryption engine, controllable for generating a decrypted symbol $I'_t$ based on the output symbol received from the origination space via the communications channel, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and
f) wherein $I'_t$ corresponds to $I_t$.

10. The communication system of claim 9, wherein the encryption engine further includes W look-up tables for storing each of the possible W sets of permutations.

11. The communication system of claim 9, wherein the encryption engine further includes M<W look-up tables for storing M available sets of the possible W sets of permutations.

12. The communication system of claim 9, wherein the encryption engine further includes N<M<W look-up tables for storing N sets of permutations preselected from M available sets of the possible W sets of permutations.

13. A communication system, comprising:
a) an origination space;
b) a communications channel; and
c) a destination space associated with the origination space via the communications channel;
d) wherein the origination space includes:
  1) means for receiving an input symbol $I_t$, an encrypt key and an encrypt text/key relation; and
  2) an encryption engine, controllable by the encrypt text/key relation for generating an output symbol $O_t$ based on the input symbol, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;

e) wherein the destination space includes:
1) means for receiving a decrypt key and a decrypt text/key relation; and
2) a decryption engine, controllable for generating a decrypted symbol $I'_t$ based on the output symbol received from the origination space via the communications channel, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key f) wherein $\alpha(t)$ is a step function and $\alpha_X(t)$, X={0, 1, 2, ..., N−1, N}, increments the sequence of $\pi_X$ for each value that t equals an integer multiple of R, where R is a prime number.

14. A communication system, comprising:
a) an origination space;
b) a communications channel; and
c) a destination space associated with the origination space via the communications channel;
d) wherein the origination space includes:
2) means for receiving an input symbol $I_t$, an encrypt key and an encrypt text/key relation; and
2) an encryption engine controllable by the encrypt text/key relation for generating an output symbol $O_t$ based on the input symbol, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key and where W represents the number of possibilities for each permutation defined by the encrypt key;

e) wherein the destination space includes:
1) means for receiving a decrypt key and a decrypt text/key relation; and
2) a decryption engine controllable for generating a decrypted symbol $I'_t$ based on the output symbol received from the origination space via the communications channel, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key f) wherein $\alpha(t)$ is a step function and $\alpha_X(t)$, X={0, 1, 2, ..., N−1, N}, decrements the sequence of $\pi_X$ for each value that t equals an integer multiple of R, where R is a prime number.

15. A communication system, comprising:
a) an origination space;
b) a communications channel; and
c) a destination space associated with the origination space via the communications channel;
d) wherein the origination space includes:
1) means for receiving an input symbol $I_t$, an encrypt key, and an encrypt text/key relation; and
2) an encryption engine controllable by the encrypt text/key relation for generating an output symbol $O_t$ based on the input symbol, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ no are N permutations defined by the encrypt key, and where W represents the number of possibilities for each permutation defined by the encrypt key;

e) wherein the destination space includes:
1) means for receiving a decrypt key and a decrypt text/key relation; and
2) a decryption engine, controllable for generating a decrypted symbol $I'_t$ based on the output symbol received from the origination space via the communications channel, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key f) wherein $\alpha(t)$ is a step function and $\alpha_X(t)$, X={0, 1, 2, ..., N−1, N}, increments the sequence of $\pi_X$ for each value of t except when t equals an integer multiple of R, where R is a prime number.

16. A communication system, comprising:
a) an origination space;
b) a communications channel; and
c) a destination space associated with the origination space via the communications channel;
d) wherein the origination space includes:
1) means for receiving an input symbol $I_t$, an encrypt key, and an encrypt text/key relation; and
2) an encryption engine, controllable by the encrypt text/key relation for generating an output symbol $O_t$ based on the input symbol, such that $O_t = \alpha_N(t) + \pi_N[\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;

e) wherein the destination space includes:
1) means for receiving a decrypt key and a decrypt text/key relation; and
2) a decryption engine, controllable for generating a decrypted symbol $I'_t$ based on the output symbol received from the origination space via the communications channel, such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key f) wherein $\alpha(t)$ is a step function and $\alpha_X(t)$, X={0, 1, 2, ..., N−1, N}, decrements the sequence of $\pi_X$ for each value of t except when t equals an integer multiple of R, where R is a prime number.

17. A communication system, comprising:
a) a first computer;
b) a communications channel; and
c) a second computer coupled with the first computer via the communications channel;

d) wherein the first computer includes:
1) a symbol input port for receiving an input symbol $I_t$;
2) an encrypt key input port for receiving an encrypt key;
3) a first memory, for storing an encrypt text/key relation; and
4) a first microprocessor for generating an output symbol $O_t$ based on the input symbol, controlled by the encrypt text/key relation such that $O_t = \alpha_N(t) + \pi_N [\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;

e) wherein the second computer includes:
1) a decrypt key input port for receiving a decrypt key;
2) a second memory, for storing a decrypt text/key relation; and
3) a second microprocessor for generating a decrypted symbol $I'_t$ based on the output symbol received from the origination space via the communications channel, controlled by the decrypt text/key relation such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and f) wherein $I'_t$ corresponds to $I_t$.

18. The communication system of claim 17, wherein the first computer further includes W look-up tables for storing each of the possible W sets of permutations.

19. The communication system of claim 17, wherein the first computer further includes M<W look-up tables for storing M available sets of the possible W sets of permutations.

20. The communication system of claim 17, wherein the first computer further includes N<M<W look-up tables for storing N sets of permutations preselected from M available sets of the possible W sets of permutations.

21. A communication system, comprising:
a) a first computer;
b) a communications channel; and
c) a second computer coupled with the first computer via the communications channel;
d) wherein the first computer includes:
1) a symbol input port for receiving an input symbol $I_t$;
2) an encrypt key input port for receiving an encrypt key;
3) a first memory, for storing an encrypt text/key relation; and
4) a first microprocessor for generating an output symbol $O_t$ based on the input symbol, controlled by the encrypt text/key relation such that $O_t = \alpha_N(t) + \pi_N [\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots, \pi_2, \pi_0$ are N permutations defined by the encrypt key, and where W represents the number of possibilities for each permutation defined by the encrypt key;

e) wherein the second computer includes:
1) a decrypt key input port for receiving a decrypt key;
2) a second memory, for storing, a decrypt text/key relation; and
3) a second microprocessor for generating, a decrypted symbol $I'_t$ based on the output symbol received from the origination space via the communications channel, controlled by the decrypt text/key relation such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)]\alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and f) wherein $\alpha(t)$ is a step function, and $\alpha_X(t)$, $X=\{0, 1, 2, \ldots, N-1, N\}$, increments the sequence of $\pi_X$ for each value that t equals an integer multiple of R, where R is a prime number.

22. A communication system, comprising:
a) a first computer;
b) a communications channel; and
c) a second computer coupled with the first computer via the communications channel;
d) wherein the first computer includes:
1) a symbol input port for receiving an input symbol $I_t$;
2) an encrypt key input port for receiving an encrypt key;
3) a first memory, for storing an encrypt text/key relation; and
4) a first microprocessor for generating an output symbol $O_t$ based on the input symbol, controlled by the encrypt text/key relation such that $O_t = \alpha_N(t) + \pi_N [\alpha_{N-1}(t) + \pi_{N-1}[\alpha_{N-2}(t) + \ldots + \pi_2[\alpha_1(t) + \pi_1[I_t + \alpha_0(t)]] \ldots ]]$, mod W, where $\alpha_N, \alpha_{N-1}, \ldots, \alpha_1, \alpha_0$ are N+1 additive transformations defined by the encrypt key where $\pi_N, \pi_{N-1}, \ldots, \pi_2, \pi_0$ are N permutations defined by the encrypt key, and where W represents the number of possibilities for each permutation defined by the encrypt key;

e) wherein the second computer includes:
1) a decrypt key input port for receiving a decrypt key;
2) a second memory, for storing a decrypt text/key relation; and
3) a second microprocessor for generating a decrypted symbol $I'_t$ based on the output symbol received from the origination space via the communications channel, controlled by the decrypt text/key relation such that $I'_t = \pi_1^{-1}[\pi_2^{-1}[\pi_3^{-1} \ldots [\pi_{N-1}^{-1}[\pi_N^{-1}[O_t - \alpha'_N(t)] - \alpha'_{N-1}(t)] - \ldots - \alpha'_3(t)] - \alpha'_2(t)] - \alpha'_1(t)] - \alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and f) wherein $\alpha(t)$ is a step function, and $\alpha_X(t)$, $X=\{0, 1, 2, \ldots, N-1, N\}$, decrements the sequence of $\pi_X$ for each value that t equals an integer multiple of R, where R is a prime number.

23. A communication system, comprising:
a) a first computer;
b) a communications channel; and
c) a second computer coupled with the first computer via the communications channel;

d) wherein the first computer includes:
  1) a symbol input port for receiving an input symbol $I_t$;
  2) an encrypt key input port for receiving an encrypt key;
  3) a first memory, for storing an encrypt text/key relation; and
  4) a first microprocessor for generating an output symbol $O_t$ based on the input symbol, controlled by the encrypt text/key relation such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots \pi_2, \pi_0$ are N permutations defined by the encrypt key, and where W represents the number of possibilities for each permutation defined by the encrypt key;

e) wherein the second computer includes:
  1) a decrypt key input port for receiving a decrypt key;
  2) a second memory, for storing a decrypt text/key relation; and
  3) a second microprocessor for generating a decrypted symbol $I'_t$ based on the output symbol received from the origination space via the communications channel, controlled by the decrypt text/key relation such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and f) wherein $\alpha(t)$ is a step function, and $\alpha_X(t)$, X={0, 1, 2, ..., N-1, N}, increments the sequence of $\pi_X$ for each value of t except when t equals an integer multiple of R, where R is a prime number.

24. A communication system, comprising:
a) a first computer;
b) a communications channel; and
c) a second computer coupled with the first computer via the communications channel;
d) wherein the first computer includes:
  1) a symbol input port for receiving an input symbol $I_t$;
  2) an encrypt key input port for receiving an encrypt key;
  3) a first memory, for storing an encrypt text/key relation; and
  4) a first microprocessor for generating an output symbol $O_t$ based on the input symbol, controlled by the encrypt text/key relation such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 additive transformations defined by the encrypt key, where $\pi_N, \pi_{N-1}, \ldots \pi_2, \pi_0$ are N permutations defined by the encrypt key, and where W represents the number of possibilities for each permutation defined by the encrypt key;

e) wherein the second computer includes:
  1) a decrypt key input port for receiving a decrypt key;
  2) a second memory, for storing a decrypt text/key relation; and
  3) a second microprocessor for generating a decrypted symbol $I'_t$, based on the output symbol received from the origination space via the communications channel, controlled by the decrypt text/key relation such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]\alpha'_1(t)]-\alpha'_0(t)$, mod W, where $\pi_i^{-1}$ is defined by the decrypt key as the inverse of the permutation $\pi_i$, where $\alpha'_N, \alpha'_{N-1}, \ldots, \alpha'_1, \alpha'_0$ are N+1 additive transformations defined by the decrypt key, and where W represents the number of possibilities for each inverse permutation defined by the decrypt key; and f) wherein $\alpha(t)$ is a step function, and $\alpha_X(t)$, X={0, 1, 2, ..., N-1, N}, decrements the sequence of $\pi_X$ for each value of t except when t equals an integer multiple of R, where R is a prime number.

25. A process of communicating between an origination space and a destination space, comprising:
receiving an input symbol $I_t$ at the origination space;
generating an output symbol $O_t$ based on the input symbol, such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 predetermined additive transformations, where $\pi_N, \pi_{N-1}, \ldots, \pi_2, \pi_0$ are N predetermined permutations, and where W represents the number of possibilities for each permutation;
receiving the output symbol at the destination space; and
generating a decrypted symbol $I'_t$ based on the received output symbol, such that $I'_t=\pi_1^{-1}[\pi_2^{-1}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is an inverse of the predetermined permutation $\pi_i$, where $\alpha'_N, \alpha'_{N-1}, \ldots, \alpha'_1, \alpha'_0$ are N+1 predetermined additive transformations, and where W represents the number of possibilities for each inverse permutation;
wherein $I'_t$ corresponds to $I_t$.

26. The process of claim 25, further including retrieving the possible W sets of permutations from W look-up tables, prior to generating the output symbol.

27. The process of claim 25, further including retrieving M available sets of the possible W sets of permutations from M<W look-up tables, prior to generating the output symbol.

28. The process of claim 25, further including retrieving N sets of permutations preselected from M available sets of the possible W sets of permutations from N<M<W look-up tables, prior to generating the output symbol.

29. A process of communicating between an origination space and a destination space, comprising:
receiving an input symbol $I_t$, at the origination space;
generating an output symbol $O_t$ based on the input symbol, such that $O_t=\alpha_N(t)+\pi_N[\alpha_{N-1}(t)+\pi_{N-1}[\alpha_{N-2}(t)+ \ldots +\pi_2[\alpha_1(t)+\pi_1[I_t+\alpha_0(t)]] \ldots ]]$, mod W, where $\alpha_N, \alpha_{N-1}, \ldots, \alpha_1, \alpha_0$ are N+1 predetermined additive transformations, where $\pi_N, \pi_{N-1}, \ldots, \pi_2, \pi_0$ are N predetermined permutations, and where W represents the number of possibilities for each permutation;
receiving the output symbol at the destination space;
generating a decrypted symbol $I'_t$ based on the received output symbol, such that $I'_t=\pi_1^{-1}[\pi_2^{-7}[\pi_3^{-1} \ldots [\pi_{N-1}^{-1}[\pi_N^{-1}[O_t-\alpha'_N(t)]-\alpha'_{N-1}(t)]- \ldots -\alpha'_3(t)]-\alpha'_2(t)]-\alpha'_1(t)]-\alpha'_0(t)$, mod W, where $\pi_i^{-1}$ is an inverse of the predetermined permutation $\pi_i$, where $\alpha'_N, \alpha'_{N-1}, \ldots, \alpha'_1, \alpha'_0$ are N+1 predetermined additive transformations, and where W represents the number of possibilities for each inverse permutation; and
using $\alpha_X(t)$, X={0, 1, 2, ..., N-1, N}, to increment the sequence of $\pi_X$ for each value that t equals an integer multiple of R, where R is a prime number and $\alpha(t)$ is a step function.

30. A process of communicating between an origination space and a destination space, comprising:

receiving an input symbol $I_t$ at the origination space;

generating an output symbol $O_t$ based on the input symbol, such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$ mod W, where $\alpha_N$, $\alpha_{N-1}$, ..., $\alpha_1$, $\alpha_0$ are N+1 predetermined additive transformations, where $\pi_N$, $\pi_{N-1}$, ..., $\pi_2$, $\pi_0$ are N predetermined permutations, and where W represents the number of possibilities for each permutation;

receiving the output symbol at the destination space;

generating a decrypted symbol $I'_t$, based on the received output symbol, such that $I'_t=\pi_1^{-1}[\pi_2^{-1}[\pi_3^{-1}\ldots[\pi_{N-1}^{-1}[\pi_N^{-1}[O_t-\alpha'_N(t)]-\alpha'_{N-1}(t)]-\ldots-\alpha'_3(t)]-\alpha'_2(t)]-\alpha'_1(t)]-\alpha'_0(t)$, mod W, where $\pi_i^{-1}$ is an inverse of the predetermined permutation $\pi_i$, where $\alpha'_N$, $\alpha'_{N-1}$, ..., $\alpha'_1$, $\alpha'_0$ are N+1 predetermined additive transformations, and where W represents the number of possibilities for each inverse permutation; and using $\alpha_X(t)$, X={0, 1, 2, ..., N−1, N}, to decrement the sequence of $\pi_X$ for each value that t equals an integer multiple of R, where R is a prime number and $\alpha(t)$ is a step function.

31. A process of communicating between an origination space and a destination space, comprising:

receiving an input symbol $I_t$ at the origination space;

generating an output symbol $O_t$ based on the input symbol, such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$, mod W, where $\alpha_N$, $\alpha_{N-1}$, ..., $\alpha_1$, $\alpha_0$ are N+1 predetermined additive transformations, where $\pi_N$, $\pi_{N-1}$, ..., $\pi_2$, $\pi_0$ are N predetermined permutations, and where W represents the number of possibilities for each permutation;

receiving the output symbol at the destination space;

generating a decrypted symbol $I'_t$ based on the received output symbol, such that $I'_t=\pi_1^{-1}[\pi_2^{-1}[\pi_3^{-1}\ldots[\pi_{N-1}^{-1}[\pi_N^{-1}[O_t-\alpha'_N(t)]-\alpha'_{N-1}(t)]-\ldots-\alpha'_3(t)]-\alpha'_2(t)]-\alpha'_1(t)]-\alpha'_0(t)$, mod W, where $\pi_i^{-1}$ is an inverse of the predetermined permutation $\pi_i$, where $\alpha'_N$, $\alpha'_{N-1}$, ..., $\alpha'_1$, $\alpha'_0$ are N+1 predetermined additive transformations, and where W represents the number of possibilities for each inverse permutation; and using $\alpha_X(t)$, X={0, 1, 2, ..., N−1, N}, to increment the sequence of $\pi_X$ for each value of t except when t equals an integer multiple of R, where R is a prime number and $\alpha(t)$ is a step function.

32. A process of communicating between an origination space and a destination space, comprising:

receiving an input symbol $I_t$ at the origination space;

generating an output symbol $O_t$ based on the input symbol, such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$, mod W, where $\alpha_N$, $\alpha_{N-1}$, ..., $\alpha_1$, $\alpha_0$ are N+1 predetermined additive transformations, where $\pi_N$, $\pi_{N-1}$, ..., $\pi_2$, $\pi_0$ are N predetermined permutations, and where W represents the number of possibilities for each permutation;

receiving the output symbol at the destination space;

generating a decrypted symbol $I'_t$ based on the received output symbol, such that $I'_t=\pi_1^{-1}[\pi_2^{-1}[\pi_3^{-1}\ldots[\pi_{N-1}^{-1}[\pi_N^{-1}[O_t-\alpha'_N(t)]-\alpha'_{N-1}(t)]-\ldots-\alpha'_3(t)]-\alpha'_2(t)]-\alpha'_1(t)]-\alpha_0(t)$, mod W, where $\pi_i^{-1}$ is an inverse of the predetermined permutation $\pi_i$, where $\alpha'_N$, $\alpha'_{N-1}$, ..., $\alpha'_1$, $\alpha'_0$ are N+1 predetermined additive transformations, and where W represents the number of possibilities for each inverse permutation; and using $\alpha_X(t)$, X={0, 1, 2, ..., N−1, N }, to decrement the sequence of $\pi_X$ for each value of t except when t equals an integer multiple of R, where R is a prime number and $\alpha(t)$ is a step function.

33. A storage medium, comprising:

interface means, and means for controlling a microprocessor, via the interface means, to produce an output symbol $O_t$, such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$, mod W, where $I_t$ is an input symbol, $\alpha_N$, $\alpha_{N-1}$, ..., $\alpha_1$, $\alpha_0$ are N+1 additive transformations defined by a key, $\pi_N$, $\pi_{N-1}$, ..., $\pi_2$, $\pi_0$ are N permutations defined by the key, and W represents the number of possibilities for each permutation defined by the key, and where $\alpha(t)$ is a step function, and $\alpha_X(t)$, X={0, 1, 2, ..., N−1, N}, increments the sequence of $\pi_X$ for each value that t equals an integer multiple of R, where R is a prime number.

34. A storage medium, comprising:

interface means, and means for controlling a microprocessor, via the interface means, to produce an output symbol $O_t$, such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$, mod W, where $I_t$ is an input symbol, $\alpha_N$, $\alpha_{N-1}$, ..., $\alpha_1$, $\alpha_0$ are N+1 additive transformations defined by a key, $\pi_N$, $\pi_{N-1}$, ..., $\pi_2$, $\pi_0$ are N permutations defined by the key, and W represents the number of possibilities for each permutation defined by the key, and where $\alpha(t)$ is a step function, and $\alpha_X(t)$, X={0, 1, 2, ..., N−1, N}, increments the sequence of $\pi_X$ for each value that t equals an integer multiple of R, where R is a prime number.

35. A storage medium, comprising:

interface means, and means for controlling a microprocessor, via the interface means, to produce an output symbol $O_t$ such that $O_t=\alpha_N(t)+\pi_N[\alpha_{N-1}(t)+\pi_{N-1}[\alpha_{N-2}(t)+\ldots+\pi_2[\alpha_1(t)+\pi_1[I_t+\alpha_0(t)]]\ldots]]$, mod W, where $I_t$ is an input symbol, $\alpha_N$, $\alpha_{N-1}$, ..., $\alpha_1$, $\alpha_0$ are N+1 additive transformations defined by a key, $\pi_N$, $\pi_{N-1}$, ... $\pi_2$, $\pi_0$ are N permutations defined by the key, and W represents the number of possibilities for each permutation defined by the key, and where $\alpha(t)$ is a step function, and $\alpha_X(t)$, X={0, 1, 2, ..., N−1, N}, increments the sequence of $\pi_X$ for each value of t except when t equals an integer multiple of R, where R is a prime number.

36. A storage medium, comprising:

interface means, and means for controlling a microprocessor, via the interface means, to produce an output symbol $O_t$, such that $O_t=\alpha_N(t)+\pi_N[\alpha_{N-1}(t)+\pi_{N-1}[\alpha_{N-2}(t)+\ldots+\pi_2[\alpha_1(t)+\pi_1[+\alpha_0(t)]]\ldots]]$, mod W, where $I_t$ is an input symbol, $\alpha_N$, $\alpha_{N-1}$, ..., $\alpha_1$, $\alpha_0$ are N+1 additive transformations defined by a key, $\pi_N$, $\pi_{N-1}$, ..., $\pi_2$, $\pi_0$ are N permutations defined by the key, and W represents the number of possibilities for each permutation defined by the key, and where $\alpha(t)$ is a step function, and $\alpha_X(t)$, X={0, 1, 2, ..., N−1, N}, decrements the sequence of $\pi_X$ for each value of t except when t equals an integer multiple of R, where R is a prime number.

37. A storage medium, comprising:

interface means, and means for controlling a microprocessor, via the interface means, to produce a generated symbol I'$_t$, such that
I'$_t$=$\pi_1^{-1}[\pi_2^{-1}[\pi_3^{-1}$ . . . $[\pi_{N-1}^{-1}[\pi_N^{-1}[O_t$-$\alpha_N$(t)]-$\alpha_{N-1}$(t)]- . . . -$\alpha_3$(t)]-$\alpha_2$(t)]-$\alpha_1$(t)]-$\alpha_0$(t), mod W, where $O_t$ is a received symbol, $\alpha_N$, $\alpha_{N-1}$, . . . , $\alpha_1$, $\alpha_0$ are N+1 additive transformations defined by a key, $\pi_1^{-1}$, $\pi_2^{-1}$, $\pi_3^{-1}$ . . . , $\pi_{N-1}^{-1}$, $\pi_N^{-1}$ are N inverse permutations defined by the key, and W represents the number of possibilities for each inverse permutation defined by the key; and where $\alpha$(t) is a step function, and $\alpha_X$(t), X={0, 1, 2, . . . , N-1, N}, increments the sequence of $\pi_X$ for each value that t equals an integer multiple of R, where R is a prime number.

38. A storage medium, comprising:

interface means, and means for controlling a microprocessor, via the interface means, to produce a generated symbol I'$_t$, such that
I'$_t$=$\pi_1^{-1}[\pi_2^{-1}[\pi_3^{-1}$ . . . $[\pi_{N-1}^{-1}[\pi_N^{-1}[O_t$-$\alpha_N$(t)]-$\alpha_{N-1}$(t)]- . . . -$\alpha_3$(t)]$\alpha_2$(t)]-$\alpha_1$(t)]-$\alpha_0$(t), mod W, where $O_t$ is a received symbol, $\alpha_N$, $\alpha_{N-1}$, . . . , $\alpha_1$, $\alpha_0$ are N+1 additive transformations defined by a key, $\pi_1^{-1}$, $\pi_2^{-1}$, $\pi_3^{-1}$ . . . , $\pi_{N-1}^{-1}$, $\pi_N^{-1}$ are N inverse permutations defined by the key, and W represents the number of possibilities for each inverse permutation defined by the key; and where $\alpha$(t) is a step function, and $\alpha_X$(t), X={0, 1, 2, . . . , N-1, N}, decrements the sequence of $\pi_X$ for each value that t equals an integer multiple of R, where R is a prime number.

39. A storage medium, comprising:

interface means, and means for controlling a microprocessor, via the interface means, to produce a generated symbol I'$_t$, such that
I'$_t$=$\pi_1^{-1}[\pi_2^{-1}[\pi_3^{-1}$ . . . $[\pi_{N-1}^{-1}[\pi_N^{-1}[O_t$-$\alpha_N$(t)]-$\alpha_{N-1}$(t)]- . . . -$\alpha_3$(t)]-$\alpha_2$(t)]-$\alpha_1$(t)]-$\alpha_0$(t), mod W, where $O_t$ is a received symbol, $\alpha_N$, $\alpha_{N-1}$, . . . , $\alpha_1$, $\alpha_0$ are N+1 additive transformations defined by a key, $\pi_1^{-1}$, $\pi_2^{-1}$, $\pi_3^{-1}$ . . . , $\pi_{N-1}^{-1}$, $\pi_N^{-1}$ are N inverse permutations defined by the key, and W represents the number of possibilities for each inverse permutation defined by the key; and where $\alpha$(t) is a step function, and $\alpha_X$(t), X={0, 1, 2, . . . , N-1, N}, increments the sequence of $\pi_X$ for each value of t except when t equals an integer multiple of R, where R is a prime number.

40. A storage medium, comprising:

interface means, and means for controlling a microprocessor, via the interface means, to produce a generated symbol I'$_t$ such that
I'$_t$=$\pi_1^{-1}[\pi_2^{-1}[\pi_3^{-1}$ . . . $[\pi_{N-1}^{-1}[\pi_N^{-1}[O_t$-$\alpha_N$(t)]-$\alpha_{N-1}$(t)]- . . . -$\alpha_3$(t)]-$\alpha_2$(t)]-$\alpha_1$(t)]-$\alpha_0$(t), mod W, where $O_t$ is a received symbol, $\alpha_N$, $\alpha_{N-1}$, . . . , $\alpha_1$, $\alpha_0$ are N+1 additive transformations defined by a key, $\pi_1^{-1}$, $\pi_2^{-1}$, $\pi_3^{-1}$ . . . , $\pi_{N-1}^{-1}$, $\pi_N^{-1}$ are N inverse permutations defined by the key, and W represents the number of possibilities for each inverse permutation defined by the key; and where $\alpha$(t) is a step function, and $\alpha_X$(t), X={0, 1, 2, . . . , N-1, N}, decrements the sequence of $\pi_X$ for each value of t except when t equals an integer multiple of R, where R is a prime number.

* * * * *